(12) United States Patent
Vatamanu et al.

(10) Patent No.: US 11,835,007 B2
(45) Date of Patent: Dec. 5, 2023

(54) METHOD FOR MEASURING A PHYSICAL QUANTITY BY MEANS OF A DIGITAL SENSOR

(71) Applicant: VITESCO TECHNOLOGIES GMBH, Hanover (DE)

(72) Inventors: Lucian Vatamanu, Toulouse (FR); Jérôme Dileon, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 546 days.

(21) Appl. No.: 17/251,563

(22) PCT Filed: Jun. 19, 2019

(86) PCT No.: PCT/EP2019/066149
§ 371 (c)(1),
(2) Date: Dec. 11, 2020

(87) PCT Pub. No.: WO2019/243399
PCT Pub. Date: Dec. 26, 2019

(65) Prior Publication Data
US 2021/0254573 A1    Aug. 19, 2021

(30) Foreign Application Priority Data

Jun. 22, 2018    (FR) ...................... 1855555

(51) Int. Cl.
*G05B 21/02*    (2006.01)
*F02D 41/28*    (2006.01)
(Continued)

(52) U.S. Cl.
CPC ............. *F02D 41/28* (2013.01); *G05B 21/02* (2013.01); *F02D 41/009* (2013.01); *F02D 2041/283* (2013.01); *F02P 5/04* (2013.01)

(58) Field of Classification Search
CPC .......... G05B 21/02; F02P 5/04; F02D 41/009; F02D 41/24; F02D 41/18; F02D 2041/286
(Continued)

(56) References Cited

U.S. PATENT DOCUMENTS 9,488,140 B2    11/2016    Wakao et al.
2008/0312860 A1    12/2008    Bauerle
(Continued)

FOREIGN PATENT DOCUMENTS

DE    10 2010 040 719    3/2012
EP    1 365 234    11/2003
(Continued)

OTHER PUBLICATIONS

International Search Report and Written Opinion of the ISA for PCT/EP2019/066149 dated Aug. 9, 2019, 11 pages.
(Continued)

*Primary Examiner* — Tan V Mai
(74) *Attorney, Agent, or Firm* — NIXON & VANDERHYE

(57) ABSTRACT

A method for controlling a motor-vehicle electronic control unit with a view to acquiring the measurement of a physical quantity using a digital sensor connected to the electronic control unit, in which method the sensor sends measurement digital data with a send period and the electronic control unit processes these measurement data with a processing period, the send period being shorter than the processing period. At the end of each processing period, the average value of the measured physical quantity is determined over an interval of N preceding processing periods.

20 Claims, 2 Drawing Sheets

(51) Int. Cl.
*F02D 41/00* (2006.01)
*F02P 5/04* (2006.01)

(58) Field of Classification Search
USPC .......................................................... 708/200
See application file for complete search history.

(56) References Cited

U.S. PATENT DOCUMENTS

| | | |
|---|---|---|
| 2015/0040652 A1 | 2/2015 | Wakao et al. |
| 2017/0052056 A1 | 2/2017 | Yamasaki et al. |

FOREIGN PATENT DOCUMENTS

| | | |
|---|---|---|
| EP | 2 801 715 | 11/2014 |
| JP | 2005-226544 A | 8/2005 |
| JP | 2017-040601 A | 2/2017 |
| JP | 2017-226384 A | 12/2017 |
| WO | 2013/103018 A1 | 7/2013 |

OTHER PUBLICATIONS

Office Action issued in Japanese Patent Application No. 2021-519000 dated Jan. 5, 2022.

METHOD FOR MEASURING A PHYSICAL QUANTITY BY MEANS OF A DIGITAL SENSOR

BACKGROUND OF THE INVENTION

Field of the Invention

The invention relates to the automotive field and more particularly to methods allowing physical quantities within a motor vehicle to be measured.

Description of the Related Art

A motor vehicle commonly comprises multiple sensors that for example interact with the engine of the vehicle, with its transmission, with its doors and opening elements, etc. These sensors allow physical quantities such as temperature, pressure, the flow rate of a fluid, the presence of certain components in a fluid, vibrations, the presence or not of an object in a region, etc. to be measured. In recent motor vehicles, these sensors are commonly digital sensors, i.e. sensors able to send a frame of discrete digital signals representative of the measured physical quantity. These digital sensors advantageously allow processing of the signals representative of the measured physical quantities to be carried out by computational tools.

The digital sensors of a motor vehicle are generally connected to electronic control units, which are electronic devices comprising processing means such as microprocessors. The digital data frame sent by a digital sensor are thus received by an electronic control unit and processed by the latter so as to acquire the value of the physical quantity measured at a given time. The electronic control unit is in addition connected to actuators so that, in response to the information on physical quantities sent by the digital sensors, the electronic control unit controls these actuators with a view to managing one of the functions of the motor vehicle.

The engine control unit of a motor vehicle is one example of such an electronic control unit. The engine control unit is intended to control the operation of the internal combustion engine, and especially the injection and optionally firing sequences of the engine of the vehicle. This electronic control unit receives information from digital sensors such as sensors indicating the angular position of the crankshaft or camshafts, the temperature of the various elements, the flow rates of fluid at the intake or exhaust of the engine, etc. These digital sensors send the measurement data to the electronic control unit which, on the basis of this information, controls the fuel injectors and any spark plugs, at the appropriate moment during the combustion cycle.

As digital sensors are becoming increasingly numerous within a motor vehicle, and as the computing means of electronic control units are limited, particular attention is being given to methods for controlling electronic control units with a view to acquiring the precisest possible information, on the basis of the measurement data transmitted by the digital sensors, while employing a minimum of the processing resources of the electronic control unit.

Thus, certain digital sensors designed to send measurement digital data with a set send period are sometimes associated with electronic control units that are designed to process these data with a processing period that is longer than the send period of the digital sensor. In other words, certain digital sensors send measurement digital data at a frequency higher than the processing frequency of which the electronic control unit is capable. This situation, which is common in certain automotive applications, has led to provision being made for methods for controlling electronic control units that allow this offset between the frequency at which the measurement data are sent by the digital sensors and the frequency at which they are processed by the electronic control unit to be managed.

Up to now, methods for controlling electronic control units allowing this offset to be managed have consisted in taking into account only a single measurement datum sent by the sensor for each processing period of the electronic control unit. The electronic control unit is thus provided with one measurement datum per processing period and determines an average value of the measured physical quantity over a certain number of periods by simply taking the average of the digital data over these processing periods.

These prior-art methods lead the value of the measured physical quantity to be considered to be constant over a processing period and to vary in steps from one processing period to the next. The average obtained on this basis is therefore imprecise and does not take into account continuous variations in a physical quantity, this being particularly disadvantageous when the physical quantity varies substantially during a processing period.

SUMMARY OF THE INVENTION

The invention proposes to improve the precision with which the measurement of a physical quantity is acquired using a digital sensor the send period of which is shorter than the processing period of an electronic control unit, and to do so while optimizing the computational resources of the electronic control unit.

To this end, the invention relates to a method for controlling a motor-vehicle electronic control unit with a view to acquiring the measurement of a physical quantity using a digital sensor connected to the electronic control unit, in which method the sensor sends measurement digital data with a send period and the electronic control unit processes these measurement data with a processing period, the send period being shorter than the processing period. At the end of each processing period, the average value of the measured physical quantity is determined over an interval of N preceding processing periods. The method comprises the following steps:

storing, in a buffer memory of storage capacity equal to N+2 measurement data, a measurement datum assigned to each processing period, the measurement datum assigned to a processing period being defined as the last measurement datum received by the electronic control unit in this processing period;

with each assigned measurement datum that is stored in the buffer memory, also storing the age of the assigned measurement datum, the age of a measurement datum being defined as the duration between the reception of the measurement datum by the electronic control unit and the end of the corresponding processing period;

at the end of each processing period, determining an interpolation curve of the assigned measurement data stored in the buffer memory;

on the basis of the interpolation curve, determining the average value, over an interval of N processing periods, of the measured physical quantity.

The invention allows the dynamic behavior of the measured physical quantity over time to be finely estimated and this estimation to be employed to determine the average value thereof over a given interval. The determination of the interpolation curve of the measurement data that are stored in the buffer memory allows the variation in the measured physical quantity within a processing period to be taken into account even though the electronic control unit has available to it only one measurement datum, for this processing period. The determination of the interpolation curve aims to use the measurement data of the processing periods flanking a given processing period to estimate the dynamic shape of the curve representing the measured physical quantity within this given processing period. Thus, to determine the average of the measured physical quantity over a given interval, measurement data located outside of this interval are used to determine the variation in the measured physical quantity inside this interval, although the measurement data outside of this interval do not directly participate in the computation of the average (the outside measurement data participate only in the interpolation).

Finely estimating the dynamic behavior of the measured physical quantity allows average values, over a given interval, that are very precise and much closer to reality than those obtained with prior-art methods to be determined. This average, the precision of which is improved, is obtained without needing a greater computing capacity and therefore without placing any additional load on the signal-processing means, such as microprocessors, of the electronic control unit.

An increased precision in the obtainment of the values of the measured physical quantity allows the actuators controlled by the electronic control unit to be controlled with a correspondingly increased precision, and more safely.

The method for controlling the electronic control unit may comprise the following additional features, alone or in combination:
- the electronic control unit measures the time between the reception of a measurement datum and the end of the processing period in which this measurement datum was received, this time measurement being reset each time a processing period ends, after the corresponding measurement datum has been stored in the buffer memory as the age;
- the buffer memory used to store the successively assigned measurement data is a first-in, first-out buffer memory;
- the average of the measured physical quantity is determined over an interval of N preceding processing periods, the buffer memory having a storage capacity of N+2 assigned measurement data and their respective ages; a preferred value of N is 2;
- at the end of each processing period, the average of the measured physical quantity is determined over an interval excluding the processing period in question;
- the interpolation curve of the assigned measurement data is determined by determining an interpolation function corresponding to this interpolation curve;
- the interpolation function is determined on the basis of the identification of a data vector and of a time vector, the data vector being composed of the N+2 values of the assigned measurement data that are stored in the buffer memory and the time vector being composed of the N+2 values of the age of each of the assigned measurement data that are stored in the buffer memory;
- the time vector is constructed in a time eigenbasis, in which basis the first value of the vector, which corresponds to the moment of the reception of the first assigned measurement datum that is stored in the buffer memory, is taken as origin, and the following values of the vector correspond to the time passed between this origin and the reception of each other assigned measurement datum respectively stored in the buffer memory;
- the determination of the interpolation function consists in determining the coefficients of an integrable analytic function, a polynomial function of second degree for example;
- the average value of the measured physical quantity is determined over the interval of N processing periods by determining the antiderivative of the interpolation function.

BRIEF DESCRIPTION OF THE DRAWINGS

A preferred exemplary embodiment of the invention will now be described with reference to the appended drawings, in which.

DESCRIPTION OF THE PREFERRED EMBODIMENTS

Figure 1:
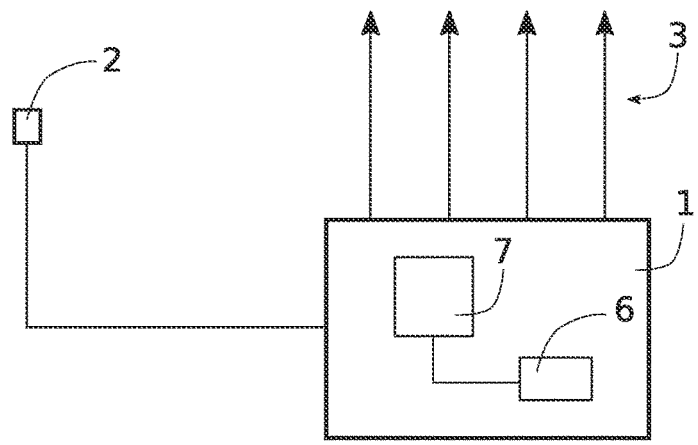
FIG. 1 schematically shows a motor-vehicle electronic control unit associated with a digital sensor.
Figure 2:
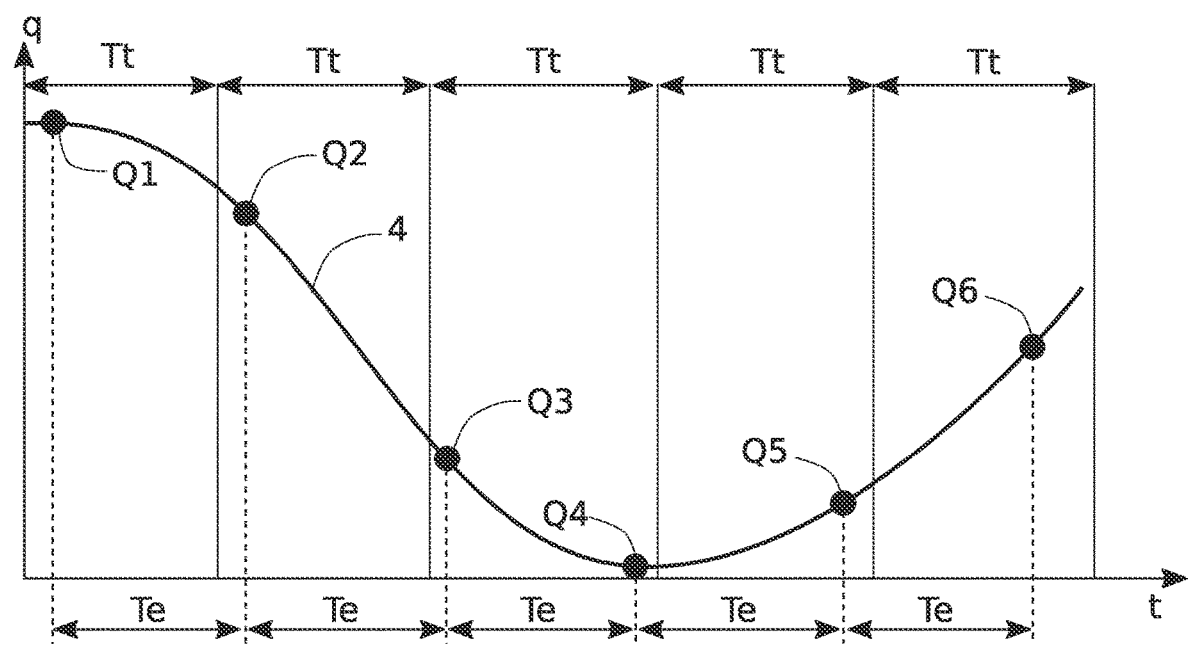
FIG. 2 is a curve illustrating an example of variation in a physical quantity measured by the digital sensor of FIG. 1.
Figure 3:
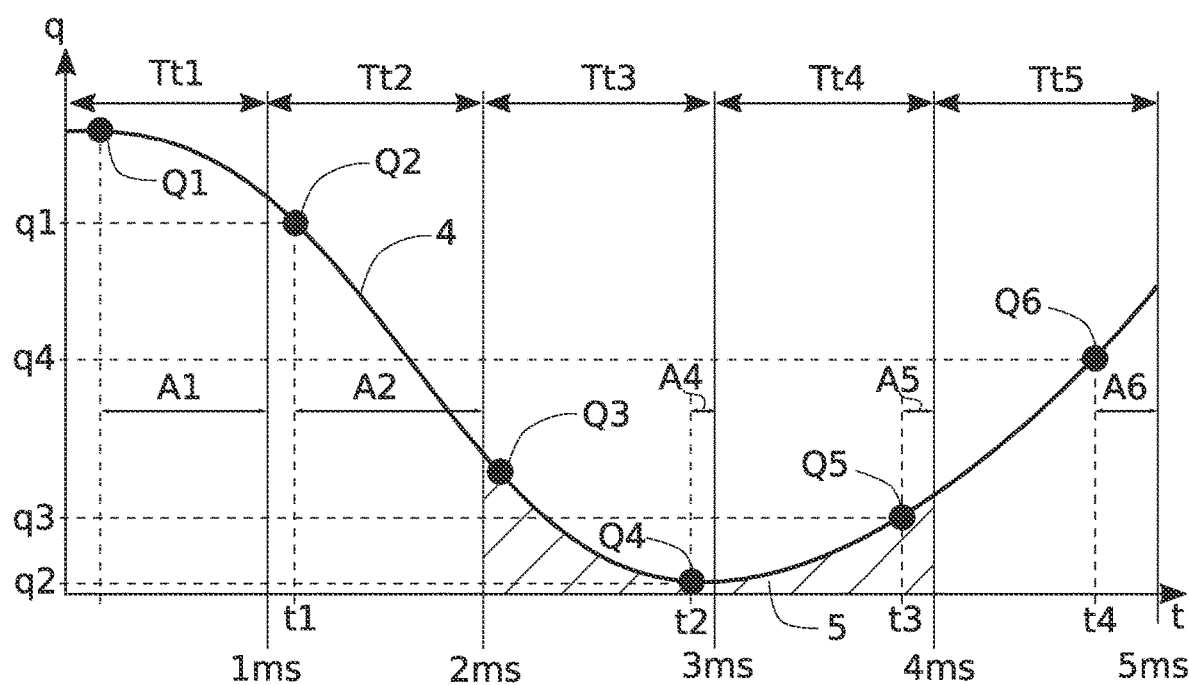
FIG. 3 illustrates, on the basis of the curve of FIG. 2, the method according to the invention.

FIGS. 1 to 3 illustrate an exemplary embodiment of the invention in which the control method is applied to an engine control unit of a motor vehicle comprising an internal combustion engine. In this example, a digital airflow sensor is placed in an intake duct of the engine of the vehicle and allows a physical quantity, which is therefore here a flow rate of air at the intake of the engine, to be measured.

FIG. 1 schematically illustrates this electronic control unit 1, which is connected to the digital sensor 2 that measures the flow rate of air. The electronic control unit 1 comprises control outputs 3 to control actuators, injectors, or spark plugs, for example.

Since the sensor 2 is a digital sensor, it sends digital measurement data with a set send period. The electronic control unit 1 possesses means for processing the digital signals, here a microprocessor 7 associated with memory devices, and in particular a buffer memory 6. The electronic control unit 1 processes the data received from the sensor 2 with a processing period that corresponds to the task, attributed to the exploitation of the signal of the sensor 2, of the microprocessor 7.

Thus, when a digital data frame (referred to as a "measurement datum" below) reaches the unit 1 to be processed, the unit 1 keeps this measurement datum in memory until the next moment at which, depending on the processing period, the unit 1 is able to process this measurement datum. The measurement of a physical quantity (in this example: a flow rate of air) is acquired by processing, within the module 1, measurement data sent by the sensor 2, this processing leading a value (such as an average) representative of the physical quantity measured over a given interval to be periodically determined. The unit 1 may thus track the variation in the value of the physical quantity and control suitable actuators in response to this variation. In the present example, the flow rate of air at the intake of the engine of the vehicle may be measured by the unit 1 depending on the data sent by the sensor 2, and the injection of fuel may be controlled via the control outputs 3 depending on this value of the flow rate of air.

FIG. 2 is a curve showing the variation in the flow rate of air q as a function of time t. In this example, the variation in the flow rate of air has a sinusoidal general shape. Curve 4 shows the actual value of the measured physical quantity, i.e. curve 4 shows the actual variations in the flow rate of air. The measurement data Q1, Q2, Q3, Q4, Q5, Q6 sent by the sensor 2 are also shown in FIG. 2.

The measurement data Q1 to Q6 are sent by the sensor 2 at a preset frequency, specific to the sensor 2, and corresponding to a send period Te. Thus, at the end of each period Te, the sensor 2 sends to the unit 1 a measurement datum corresponding to the value of the flow rate of air at the corresponding time.

In the example of FIG. 2, a first point Q1 corresponds to a first measurement data sent then, at the end of a duration corresponding to the send period Te, a second measurement datum Q2 is sent by the sensor 2 and so on until the last measurement datum Q6 is sent. Moreover, the unit 1 processes the received data with a processing period Tt. The processing period Tt corresponds to a processing frequency of the received data that is specific to the unit 1 and that is independent of the frequency at which the measurement data are sent by the sensor 2.

When the send period Te is longer than the processing period Tt, the unit 1 is capable of processing the received data at a frequency higher than the send frequency of the data. Each of the measurement data sent by the sensor thus has the time to be processed by the unit 1. In contrast, and this is the case in the present example, when the send period Te is shorter than the processing period Tt, the measured data sent by the sensor 2 are sent at a frequency higher than the processing frequency of which the unit 1 is capable. In this situation, certain measurement data sent by the sensor 2 will necessarily be lost. In the range of variation of the flow rate of air illustrated in FIG. 2, the measurement data Q1 to Q6 are sent on each emission period Te according to the variation in the flow rate of air. The measurement data Q1 and Q2 are each located inside a processing period Tt and will therefore each be correctly processed at the end of the corresponding period Tt. In contrast, the measurement data Q3 and Q4 are both sent by the sensor 2 in the same processing period Tt, this being due to the offset caused by the send period Te being shorter than the processing period Tt. In this case, only one of the two measurement data Q3 or Q4 will be able to be processed at the end of the corresponding processing period Tt.

In the present example, it is the measurement datum Q4 received last that is processed at the end of the corresponding processing period Tt, the measurement data Q3 received beforehand in the same processing period Tt then being lost.

On the basis of the example illustrated in FIG. 2, the method for controlling the electronic control unit 1 will be described with reference to FIG. 3. In FIG. 3, curve 4 of FIG. 2 has been shown again to illustrate the actual variation in the flow of air that the sensor 2 must measure. Likewise, the measurement data Q1 to Q6 sent by the sensor 2 are also indicated in FIG. 3. In this example, the sensor 2 has a send period Te of 0.9 ms whereas the unit 1 has a processing period Tt of 1 ms. In FIG. 3, each milliseconds thus corresponds to the end of one processing period Tt.

The method for controlling the unit 1 aims to obtain, at the end of each processing period Tt, the average value of the flow rate of air over an interval made up of a preset number of processing periods Tt. In the example described below, the method allows, at the end of each processing period Tt, i.e. each millisecond, the average value of the flow rate of air over an interval of two processing periods Tt to be determined. In addition, again according to the example that will be described below, this interval of two processing periods Tt precedes, without including, the processing period Tt the end of which is being considered. In other words, every millisecond, an average flow rate of air is determined over an interval of 2 ms, with a one millisecond delay. In the present example, each time a processing period Tt ends, the average value of the flow rate of air is determined over the two processing periods Tt that precede the processing period the end of which is being considered.

With reference to FIG. 3, an example of the method will be described in which, at the end of the processing period Tt5 (i.e. at the time t=5 ms), the average value of the flow rate of air measured over an interval 5 made up of the periods Tt3 and Tt4 will be determined. This interval 5 is shown hatched in FIG. 3.

The method firstly comprises a step of storing measurement data sent by the sensor 2 in the buffer memory 6.

The buffer memory 6 is a memory the capacity of which is here four measurement data. The buffer memory 6 used to store the successively received measurement data is a first-in, first-out (FIFO) buffer memory. When the buffer memory 6 is full (at the end of four received measurement data), the oldest measurement datum is erased in order to allow a new measurement data to be stored, and so on. The buffer memory 6 is thus always filled with four measurement data sent beforehand by the sensor 2.

During this storing step, the buffer memory 6 will store a single measurement datum per processing period, this single measurement datum per processing period being referred to as the "assigned measurement datum" of this processing period. The assigned measurement datum of a processing period is defined as the last measurement datum received from the sensor 2 by the unit 1 in the processing period Tt in question. Specifically, in each processing period Tt, the unit 1 receives one or more measurement data Q1 to Q6. However, a single measurement datum is stored in the buffer memory 6 per processing period Tt. Thus, when a single measurement data is received by the unit 1 during a processing period Tt, the assigned measurement datum of this processing period is this single measurement datum. When a plurality of measurement data are received by the unit 1 during a processing period Tt, the assigned measurement datum of this processing period Tt is then the measurement datum received last. For example, with reference to FIG. 3, the assigned measurement datum of the processing period Tt1 is the measurement datum Q1, whereas the assigned measurement datum of the processing period Tt3 is the measurement datum Q4, the measurement datum Q3 being lost. The buffer memory 6 thus contains, each time a processing period Tt ends, the four assigned measurement data of the four preceding processing periods.

The capacity of the buffer memory 6 allows, in addition to a measurement datum, the age of this measurement data to be stored. The age of a measurement datum is defined as the duration between the reception of the measurement datum by the unit 1 and the end of the processing period Tt in which this measurement datum was received. With reference to FIG. 3:

the age of the measurement data Q1 is denoted A1;
the age of the measurement data Q2 is denoted A2;
the age of the measurement data Q4 is denoted A4 (the measurement datum Q3 being lost);
the age of the measurement data Q5 is denoted A5;
the age of the measurement data Q6 is denoted A6.

The example of FIG. 3 shows that measurement data such as Q1 have a high age A1, almost equal to the duration of the processing period Tt1 (here 1 ms), whereas other measurement data such as Q4 have an age A4 that is not very high, the measurement datum Q4 being received by the unit 1 just before the end of the corresponding processing period Tt3.

In summary, each time a processing period Tt ends, the buffer memory 6 contains the four assigned measurement data of the four preceding processing periods, the age of each measurement data being stored conjointly with the corresponding measurement datum.

The following steps of the method consist in:
at the end of each processing period Tt, determining an interpolation curve of the measurement data stored in the buffer memory 6;
on the basis of this interpolation curve, determining the average value, over the interval 5, of the flow rate of air.

To describe the two steps indicated above more precisely, the end of the processing period Tt5 will for example be considered. Thus, at the time of the end of the processing period Tt5, i.e. at the time t=5 ms in FIG. 3, the buffer memory 6 contains:
the measurement datum Q2 and its age A2;
the measurement datum Q4 and its age A4;
the measurement datum Q5 and its age A5;
the measurement datum Q6 and its age A6.

The following operation consists in determining an interpolation curve of the four measurement data Q2, Q4, Q5, Q6 that are stored in the buffer memory 6. This interpolation curve approximates as best as possible the curve 4 of the actual variation in the flow rate of air. On the basis of this interpolation curve, the hatched area 5 may be estimated. This hatched area 5 allows an average value representative of the value of the flow rate of air over the interval made up of the processing periods Tt3 and Tt4 to be determined.

With a view to determining the interpolation curve, the unit 1 determines a data vector [q1, q2, q3, q4], and a time vector [t1, t2, t3, t4]. These two vectors form the input data used to estimate the coefficients of the interpolation function that most closely interpolates the measurement data Q2, Q4, Q5, Q6.

In the present example:
q1 is the value of the measurement datum Q2 (in units of flow rate, such as kilograms per second);
q2 is the value of the flow rate of the measurement datum Q4;
q3 is equal to the value of the flow rate given by the measurement datum Q5;
q4 is equal to the value of the flow rate given by the measurement datum Q6;
The time vector [t1, t2, t3, t4] is composed from the age A2, A4, A5, A6 of the measurement data Q2, Q4, Q5, Q6, in such a way that the moment of reception of the first measurement datum Q2, present in the buffer memory 6, is the origin t1 of the times and that the values t2, t3, and t4 correspond to the position in time of the measurement data Q4, Q5, Q6 with respect to this origin t1. Thus, t1, t2, t3, t4 are the abscissa of the points of the measurement data Q2, Q4, Q5, Q6, respectively. In this case, the values of t1, t2, t3, t4 are the following:
t1=0;
t2=A2+(1 ms−A4);
t3=t2+A4+(1 ms−A5);
t4=t3+A5+(1 ms−A6).

The interpolation curve sought for the four points Q2, Q4, Q5, Q6 will possibly for example be determined on the basis of an interpolation function that is an integrable analytic function. Any analytic function for which an antiderivative exists may be used, for example a polynomial function of Nth order, a sinusoidal function, an exponential function, a logarithmic function, etc. The function will possibly be chosen depending on prior knowledge about the actual signal (depending on the physical quantity measured by the sensor). In the present example, the interpolation curve will be determined by virtue of an interpolation function that is a polynomial function of the second order, of the type:

$$f(t)=a+b.t+c.t^2$$

a, b and c being the characteristic coefficients of the interpolation function that generates the sought interpolation curve. Any known optimization method will possibly be used to obtain the coefficients (a, b, c) of the interpolation function.

In the present example, the least-squares method is employed, in a known way, to determine the coefficients a, b, c on the basis of the data vector [q1, q2, q3, q4] and time vector [t1, t2, t3, t4].

The interpolation curve, which therefore approximates as closely as possible the actual curve 4 of the variation in the flow rate of air, will then be used to determine the area delineated under this interpolation curve, and over the interval made up of the two processing periods Tt3 and Tt4, this area being a very close approximation to the area of region 5 in FIG. 3 in so far as the interpolation curve is a very close approximation of the actual curve 4.

The area delineated under the interpolation function may be computed by any known means. This area corresponds to the integral of the interpolation curve over the processing periods Tt3 and Tt4.

For example, this area may be determined by virtue of the antiderivative of the interpolation function. The antiderivative of a function of the type:

$$f(t)=a+b.t+c.t^2$$

is written:

$$g(t)=a.t+\tfrac{1}{2}.b.t^2+\tfrac{1}{3}.c.t^3$$

The value of the integral in the interval of the processing period Tt3 and Tt4 may be written:

$$\text{Integral}=g(t_{end})-g(t_{start})$$

with: $t_{start}$=t1+A2, and $t_{end}$=t3+A5.

From this integral, the average value of the flow rate of air measured over the considered interval (the processing periods Tt3 and Tt4) is deduced: average value=integral/2 ms.

The process that has just been described is repeated at the end of each processing period Tt. Thus, for example, 1 ms after the end of the processing period Tt5, a subsequent processing period Tt6 (not shown in FIG. 3) ends, at the time t=6 ms. At this time, the average of the flow rate of air will be determined again but over an interval made up of the processing periods Tt4 and Tt5, by virtue of the four values of the measurement data Q4, Q5, Q6 and of the new assigned measurement datum of the new processing period Tt6.

At the end of each processing period Tt, a new value is determined for the flow rate of air by the unit 1 with a high precision.

Other variant embodiments of the method may be implemented without departing from the scope of the invention. For example, the interval taken into account to determine the average of the measured physical quantity may be different from two processing periods. This interval for example contains a single processing period Tt, only three assigned measurement data of three processing periods then being necessary (the processing period in question and the processing period located before said period and the processing period located after said period). In another example, if this interval contains three processing periods Tt, five assigned measurement data of five processing periods will then be necessary (the three processing periods in question and the processing period immediately before said processing periods and the processing period immediately after said processing periods).

The sensor 2 may be any digital sensor used in the motor vehicle and the electronic control unit 1 may be any electronic unit intended to produce an action depending on the values of the physical quantity measured by the sensor 2.

The invention claimed is:

1. A method for controlling a motor-vehicle electronic control unit (1) with a view to acquiring the measurement of a physical quantity using a digital sensor (2) connected to the electronic control unit (1), in which method the sensor (2) sends measurement digital data (Q) with a send period (Te) and the electronic control unit (1) processes these measurement data (Q) with a processing period (Tt), the send period (Te) being shorter than the processing period (Tt), wherein in this method, at the end of each processing period (Tt), the average value of the measured physical quantity is determined over an interval (5) of N preceding processing periods (Tt), the method comprising:
storing, in a buffer memory (6) of storage capacity equal to N+2 measurement data (Q), a measurement datum assigned to each processing period (Tt), the measurement datum assigned to a processing period being defined as the last measurement datum (Q) received by the electronic control unit (1) in this processing period;
with each assigned measurement datum that is stored in the buffer memory (6), also storing the age (A) of the assigned measurement datum, the age (A) of a measurement datum (Q) being defined as the duration between the reception of the measurement datum by the electronic control unit (1) and the end of the corresponding processing period (Tt);
at the end of each processing period (Tt), determining an interpolation curve of the assigned measurement data stored in the buffer memory (6);
on the basis of the interpolation curve, determining the average value, over an interval (5) of N processing periods (Tt), of the measured physical quantity.

2. The method as claimed in claim 1, wherein the electronic control unit (1) measures the time between the reception of a measurement datum (Q) and the end of the processing period (Tt) in which this measurement datum was received, this time measurement being reset each time a processing period (Tt) ends, after the corresponding measurement datum (Q) has been stored in the buffer memory (6) as the age (A).

3. The method as claimed in either claim 2, wherein the buffer memory (6) used to store the successively assigned measurement data (Q) is a first-in, first-out buffer memory.

4. The method as claimed in claim 2, wherein the average of the measured physical quantity is determined over an interval (5) of 2 preceding processing periods (Tt), the buffer memory (6) having a storage capacity of 4 assigned measurement data (Q) and their respective ages (A).

5. The method as claimed in claim 2, wherein, at the end of each processing period (Tt), the average of the measured physical quantity is determined over an interval (5) excluding the processing period in question.

6. The method as claimed in claim 2, wherein the interpolation curve of the assigned measurement data is determined by determining an interpolation function corresponding to this interpolation curve.

7. The method as claimed in either claim 1, wherein the buffer memory (6) used to store the successively assigned measurement data (Q) is a first-in, first-out buffer memory.

8. The method as claimed in claim 7, wherein the average of the measured physical quantity is determined over an interval (5) of 2 preceding processing periods (Tt), the buffer memory (6) having a storage capacity of 4 assigned measurement data (Q) and their respective ages (A).

9. The method as claimed in claim 7, wherein, at the end of each processing period (Tt), the average of the measured physical quantity is determined over an interval (5) excluding the processing period in question.

10. The method as claimed in claim 7, wherein the interpolation curve of the assigned measurement data is determined by determining an interpolation function corresponding to this interpolation curve.

11. The method as claimed in claim 1, wherein the average of the measured physical quantity is determined over an interval (5) of 2 preceding processing periods (Tt), the buffer memory (6) having a storage capacity of 4 assigned measurement data (Q) and their respective ages (A).

12. The method as claimed in claim 11, wherein, at the end of each processing period (Tt), the average of the measured physical quantity is determined over an interval (5) excluding the processing period in question.

13. The method as claimed in claim 11, wherein the interpolation curve of the assigned measurement data is determined by determining an interpolation function corresponding to this interpolation curve.

14. The method as claimed in claim 1, wherein, at the end of each processing period (Tt), the average of the measured physical quantity is determined over an interval (5) excluding the processing period in question.

15. The method as claimed in claim 14, wherein the interpolation curve of the assigned measurement data is determined by determining an interpolation function corresponding to this interpolation curve.

16. The method as claimed in claim 1, wherein the interpolation curve of the assigned measurement data is determined by determining an interpolation function corresponding to this interpolation curve.

17. The method as claimed in claim 16, wherein the interpolation function is determined on the basis of the identification of a data vector (q1, q2, q3, q4) and of a time vector (t1, t2, t3, t4), the data vector being composed of the N+2 values of the assigned measurement data that are stored in the buffer memory (6) and the time vector being composed of the N+2 values of the age of each of the assigned measurement data that are stored in the buffer memory (6).

18. The method as claimed in claim 17, wherein the time vector (t1, t2, t3, t4) is constructed in a time eigenbasis, in which basis the first value (t1) of the vector, which corresponds to the moment of the reception of the first assigned measurement datum that is stored in the buffer memory (6), is taken as origin, and the following values (t2, t3, t4) of the vector correspond to the time passed between this origin (t1) and the reception of each other assigned measurement datum respectively stored in the buffer memory (6).

19. The method as claimed in claim 16, wherein the determination of the interpolation function consists in determining the coefficients of an integrable analytic function.

20. The method as claimed in claim 16, wherein the average value of the measured physical quantity is determined over the interval (5) of N processing periods (Tt) by determining the antiderivative of the interpolation function.

* * * * *